(12) United States Patent
Peng et al.

(10) Patent No.: US 11,003,553 B2
(45) Date of Patent: *May 11, 2021

(54) METHOD AND APPARATUS FOR FAILOVER PROCESSING

(71) Applicant: EMC IP Holding Company LLC, Hopkinton, MA (US)

(72) Inventors: Peter Hailin Peng, Beijing (CN); Yong Zou, Beijing (CN); Peng Wu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/450,079

(22) Filed: Jun. 24, 2019

(65) Prior Publication Data

US 2019/0310924 A1    Oct. 10, 2019

Related U.S. Application Data

(63) Continuation of application No. 15/627,598, filed on Jun. 20, 2017, now Pat. No. 10,372,565.

(30) Foreign Application Priority Data

Jun. 21, 2016    (CN) .......................... 201610454922.9

(51) Int. Cl.
*G06F 11/07* (2006.01)
*G06F 11/20* (2006.01)

(52) U.S. Cl.
CPC ........ *G06F 11/203* (2013.01); *G06F 11/2025* (2013.01); *G06F 11/2043* (2013.01); *G06F 2201/805* (2013.01); *G06F 2201/815* (2013.01)

(58) Field of Classification Search
CPC ........................... G06F 11/203; G06F 11/2033
USPC .................................................. 714/4.11, 6.3
See application file for complete search history.

(56) References Cited

U.S. PATENT DOCUMENTS

| 7,543,174 | B1 | 6/2009 | Van Rietschote et al. |
|---|---|---|---|
| 9,430,256 | B2* | 8/2016 | Raghu ........................ G06F 9/50 |
| 2004/0249904 | A1 | 12/2004 | Moore et al. |
| 2010/0077250 | A1 | 3/2010 | Koh et al. |
| 2010/0325471 | A1 | 12/2010 | Mishra et al. |
| 2011/0138218 | A1* | 6/2011 | Li ........................ H04L 41/0896 714/1 |

(Continued)

FOREIGN PATENT DOCUMENTS

CN         104488291         4/2015

*Primary Examiner* — Chae M Ko
(74) *Attorney, Agent, or Firm* — BainwoodHuang

(57) ABSTRACT

Embodiments of the present disclosure provide a method and apparatus for failover. In an embodiment is provided a method implemented at a first node in a cluster comprising a plurality of heterogeneous nodes. The method comprises: determining whether an application at a second node in the cluster is failed; and in response to determining that the application is failed, causing migration of data and services associated with the application from the second node to a third node in the cluster, the migration involving at least one node heterogeneous to the second node in the cluster. The present disclosure further provides a method implemented at the third node in the cluster and corresponding devices and computer program products.

20 Claims, 6 Drawing Sheets

(56) References Cited

U.S. PATENT DOCUMENTS

2013/0185408 A1 7/2013 Ngo
2015/0019901 A1 1/2015 Griffith et al.

* cited by examiner

METHOD AND APPARATUS FOR FAILOVER PROCESSING

RELATED APPLICATIONS

This application claim priority from Chinese Patent Application Number CN201610454922.9, filed on Jun. 21, 2016 at the State Intellectual Property Office, China, titled "METHOD AND DEVICE FOR FAILOVER" the contents of which is herein incorporated by reference in its entirety.

FIELD

Embodiments of the present disclosure generally relate to the technical field of computers, and more specifically to a method and apparatus for failover.

BACKGROUND

With dramatic increase of enterprise digital data, a scale-up approach of improving performance and capacity of a system by upgrading hardware has not been able to meet increasing demands of customers due to limitations of a hardware update speed. Therefore, there is proposed a scale-out approach of dynamically upgrading the system by increasing the number of physical or virtual devices. The term "physical device" used herein refers to a physical entity such as a workstation, a blade, a mainframe, a desktop computer or a portable computer. The term "virtual device" refers to a logical device, such as a virtual machine, running on the physical entity through virtualization technologies. Compared with the scale-up approach, advantages of the scaling out are very apparent in timeliness.

In the scale-out approach, for example, a cluster composed of a plurality of physical devices may be used in place of a single physical device to provide services. Then, further improvement of the performance, the capacity and the like may be enabled by adding new devices into the cluster. However, such a cluster composed of physical devices currently lacks core cluster architecture features for cluster management, such as cluster membership management, messaging, failover and the like.

In addition to the scaling out of the physical devices, there is also provided scaling out of virtual devices. For example, a common software definition data center (SDDC) is usually deployed on a type of virtual machines (VMs). In the context of the present disclosure, a type of VMs refers to VMs based on a type of virtualization platform and framework and associated with a type of virtual machine hypervisors. Correspondingly, different types of VMs are based on different virtualization platforms and frameworks and associated with different virtual machine hypervisors. When a system needs to be upgraded, this type of VMs may be added to the SDDC to implement the scaling out. However, in such a system, the physical devices running the VMs are usually separated. Data cannot move between different physical devices and therefore cannot implement load balance. In addition, when a certain VM is failed, another VM can be restarted only on a certain physical machine, which causes interruption of services in a longer period, of time.

SUMMARY

In generally, embodiments of the present disclosure provide a method and apparatus for failover.

In a first aspect, embodiments of the present disclosure provide a method implemented at a first node in a cluster comprising a plurality of heterogeneous nodes. The method comprises: determining whether an application at a second node in the cluster is failed, and in response to determining that the application is failed, causing migration of data and services associated with the application from the second node to a third node in the cluster, the migration involving at least one node heterogeneous to the second node in the cluster.

In this aspect, embodiments of the present disclosure further provide an electronic device. The electronic device comprises: a processor and a memory storing instructions. The instructions, when run by the processor, causing the electronic device to perform the method according to this aspect.

In this aspect, embodiments of the present disclosure further provide a computer program product which is tangibly stored on a non-transient computer readable medium and including machine executable instructions, the machine executable instructions, when executed, causing the machine to perform steps of the method according to this aspect.

In a second aspect, embodiments of the present disclosure provide a method implemented at a third node in a cluster comprising a plurality of heterogeneous nodes. The method comprises: determining whether data and services associated with an application at a second node in the cluster are to be migrated to the third node, the migration involving at least one node heterogeneous to the second node in the cluster; and in response to determining the migration, obtaining the data and services associated with the application.

In this aspect, embodiments of the present disclosure further provide an electronic device. The electronic device comprises: a processor and a memory storing instructions, the instructions, when run by the processor, causing the electronic device to perform the method according to this aspect.

In this aspect, embodiments of the present disclosure further provide a computer program product which is tangibly stored on a non-transient computer readable medium and including machine executable instructions, the machine executable instructions, when executed, causing the machine to perform steps of the method according to this aspect.

Through the following description, it would be appreciated that according to embodiments of the present disclosure, when the application at one node in the cluster is failed, data and services associated with the application may be migrated from the node to another node in the cluster, the migration process involving heterogeneous nodes. In this way, seamless migration of the data and services of the application is enabled between the heterogeneous nodes, and durations for fault recovery and service interruption are substantially reduced.

It should be appreciated that the content described in the summary section is not intended to define key or essential features of embodiments of the present disclosure, nor is it intended to be used to limit the scope of the present disclosure. Other features of the present disclosure will become easily comprehensible by the following description.

BRIEF DESCRIPTION OF THE DRAWINGS

In conjunction with the accompanying drawings and with reference to the following detailed description, the above and other features, advantages, and aspects of embodiments of the present disclosure will become more apparent, in the drawings, same or similar reference numbers represent same or similar elements, wherein.

In all drawings, same or similar reference numbers represent same or similar elements.

DETAILED DESCRIPTION OF EMBODIMENTS

Figure 1:
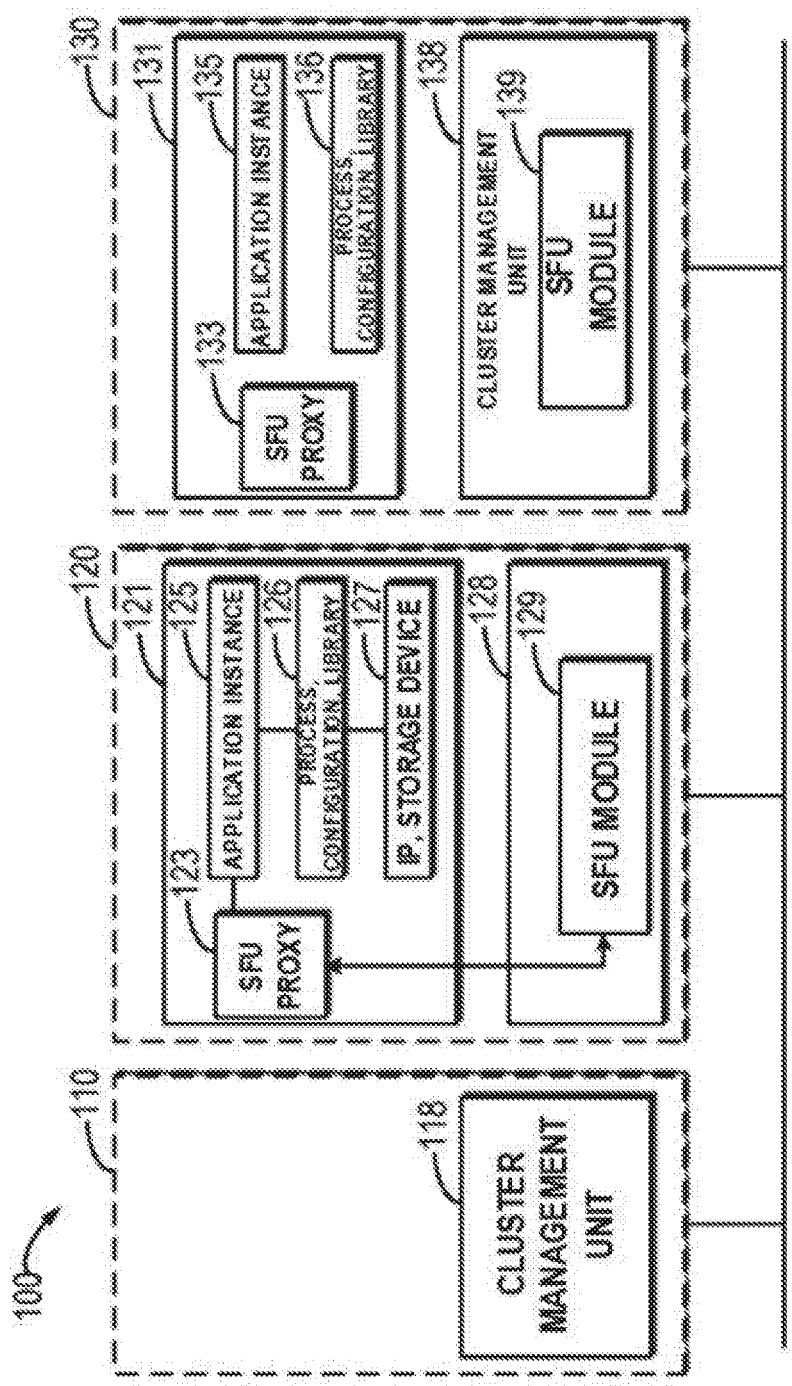
FIG. 1 illustrates an example cluster in which embodiments of the present disclosure can be implemented.

Hereinafter, embodiments of the present disclosure will be described in more detail with reference, to the accompanying drawings. Although some embodiments of the present disclosure are illustrated in the drawing, it is to be understood that the present disclosure may be implemented through various forms, but may not be interpreted as being limited to the embodiments illustrated herein. On the contrary, these embodiments are only intended to understand the present disclosure more thoroughly and completely. It is to be understood that the accompanying drawings and embodiments of the present disclosure are only for the purpose of illustration, without suggesting any limitation of the protection scope of the present disclosure.

As used herein, the term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, the scale-up approach improves the capacity and performance of the system by upgrading hardware. For example, a physical Purpose Built Backup Appliance (PBBA) system combines hardware including a central processing unit (CPU), a memory, a non-volatile memory (NVRAM), a disk, a network, and the like, and software including an operating system, proprietary file system, other backup capabilities and features, into a single-box physical appliance. When an upgrade is, needed, hardware of the PBBA system is usually replaced by the new hardware such as new generation chips, higher density disks, and the like. However, this upgrading approach is seriously limited to the hardware update speed and cannot meet the dramatically increasing demands of customers caused by the dramatic increase of the enterprise digital data, and furthermore, the costs are typically very high. In addition, with the scale-up approach, the PBBA system also has problems of excessive costs of data deduplication and a too long duration of the fault recovery.

In this case, the scale-out system increasingly draws extensive concerns. This type of system may implement the scaling out by dynamically adding physical or virtual individual devices. Compared with the scale-up approach, advantages of the scaling out are very apparent in timeliness. As described above, one approach is to use a physical cluster composed of physical devices to replace the single-box physical device to provide services, and then to implement the system upgrade by adding new physical devices into the cluster. However, this cluster system also has the problem of the too long duration of the fault recovery. In addition, as described above, such a cluster system currently lacks core cluster architecture features capable of providing cluster management, such as cluster membership management, messaging, failover, and the like.

Another approach of the scaling out is to provide services by using a virtual cluster composed of VMs. For example, more and, more enterprise applications and backup data sources are running on the SDDC, but the SDDC is typically deployed in the same type of VMs. This type of VMs may be added to the SDDC when the system needs to be upgraded. However, as described above, in the SDDC, physical devices running the VMs are typically independent in the terms of backup, and therefore data cannot be moved between different physical devices to implement the load balance. Furthermore, these physical devices are typically independent in terms of deduplication, and therefore they are not able to provide global deduplication features to achieve an optimal deduplication rate. In addition, when a VM malfunctions, it is only possible to restart another VM on a certain physical machine. The duration for implementing fault recovery by restarting the virtual machine, is still too long, and, furthermore, the restart causes a long time period of the system interruption.

Considering that physical devices and virtual machines and different types of virtual machines have their respective advantages and disadvantages. For example, compared with the physical devices, the virtual machines exhibit lower upgrading costs, but their performance and capacity are limited. In addition, a certain type of virtual machines may require costly license fees so that use costs are excessively high. Hence, it is beneficial to combine the physical devices and different types of virtual machines into a cluster. For example, this cluster system collecting the physical devices and the different types of virtual machines may provide a more flexible use platform. Furthermore, system expansion may be implemented without limitations of the physical devices and virtual machines and without limitations of the types of the virtual machine hypervisors. Furthermore, a data protection domain can be expanded across the physical devices and virtual machines and across the types of the virtual machine hypervisors. However, currently, there is no mechanism of constructing such a cluster.

In order to solve these and other potential problems, embodiments of the present disclosure provide a mechanism of deploying a cluster at heterogeneous nodes. The term "node" used herein refers to any suitable type of physical and virtual devices capable of providing services for customers. The term "heterogeneous node" used herein refers to different types of nodes such as physical and virtual devices, or different, types of nodes such as different types of VMs. In this cluster, the system may be scaled out in a convenient, flexible, simple and quick way.

Embodiments of the present disclose further provide a method of migrating data and services of applications across heterogeneous nodes in the cluster. This method migrates, when an application at a node in the cluster is failed, the data and services associated with the application from the node to another node where this migrating process involves the heterogeneous nodes. In this way, seamless migration of the data and services of the application is implemented between the heterogeneous node, and the durations of fault recovery and service interruption are substantially reduced.

FIG. 1 illustrates an example cluster 100 in which embodiments of the present disclosure can be implemented. The cluster 100 comprises three nodes 110, 120 and 130. The first node 110 is a master node of the cluster 100, and the second node 120 and the third node 130 are slave nodes of the cluster 100. At least two of the three nodes 110, 120 and 130 are heterogeneous to one another, and they may communicate with one another for example via a cluster interconnection network (not shown). The cluster interconnection network may be any wired and/or wireless communication medium which is currently known or to be developed in the future, comprising communication network, computer network and/or in-machine communication channel such as inter-process communication. The number of nodes shown in FIG. 1 is only for illustration and not intended for limitation. The system 100 may comprise any proper number of nodes.

As shown in the figure, the application has an instance 125 (referred to as "a first application instance 125") at the second node 120 and has another instance 135 (referred to as "a second application instance 135") at the third node 130. The term "instance" used herein is a specific implementation of an application in a given target environment. That is to say, after an application is deployed to one node, an instance of the application is created at the node.

According to the embodiment of the present disclosure, when the first application instance 125 at the second node 120 is failed, the data and services associated with the application may be migrated to the second application instance 135 at the third node 130. The second node 120 may detect in any proper manner whether the first application instance 125 is failed. As an example, as shown in the figure, in some embodiments, the second node 120 comprises a first service failover unit (SFU) 121 packaged with the first application instance 125 and an associated process, library and configuration data (126). In addition, in some embodiments, the first SFU 121 is further packaged with a first SFU proxy 123 which may interact with the first application instance 125. The packaging may be implemented using any proper technology which is currently known or to be developed in the future. For example, the container technology of Linux Container (LXC) may be used. Such container technology is already known in the art and will not be detailed here.

As shown in the figure, the first application instance 125 at the second node 120 is running. The first application instance 125 has already been allocated with an Internet Protocol (IP) address (e.g., dynamic IP address) and, a storage device (127). Depending on specific implementation, the storage device may be located at the second node 120 or located in the cluster 100 while outside the second node 120, for example, in an external cluster storage pool. Data associated with the application and service-relates information may be stored in the storage device, and the service-related information for example comprises a process, a library and configuration information associated with the application.

At this time, the first SFU 121 is also running, and its first SFU proxy 123 is communicating with the first application instance 125. Through the communication, the first SFU proxy 123 may monitor the state of the first application instance 125, for example, the first SFU 123 may determine whether the first application instance 125 is failed. This will be described in detail later.

According to the embodiment of the present disclosure, after the second node 120 determines that the first application instance 125 is failed, the migration of data and services associated with the application to the third node 130 may be executed in any proper manner. As shown in the figure, in some embodiments, the second node 120 further comprises a second cluster management unit 128. The second cluster management unit 128 optionally comprises a first SFU module 129 that may communicate with the first SFU proxy 123 in the first SFU 121. The cluster management unit (more specifically, the SRI module included therein) can effectively ensure the failover between heterogeneous nodes.

Specifically, after detecting the fault of the first application instance 125, the first SFU proxy 123 reports the fault situation to the first SFU module 129. The reporting may be implemented with any proper message. For example, the report may be sent using a Remote Process Call (RPC) message. In this way, the second cluster management unit 128 at the second node 120 may acquire the fault situation of the application. Then, the second cluster management unit 128 may communicate with a first cluster management, unit 118 at the first node 110 and a third cluster management unit 138 at the third node 130 through cluster interconnection network such as a high-rate (e.g., 10 GB/s) Ethernet, to assist in migrating the data and services associated with the application to the third node 130. A specific interaction process between nodes will be described in detail later.

As shown in the figure, in some embodiments, the second application instance 135 of the application at the third node 130 is packaged into the second SFU 131. Likewise, the packaging may be implemented using any proper technology such as container technology. In some embodiments, in response to acquiring that the data and services associated with the application are to be migrated to the local, the third node 130 may for example obtain data and services information from the storage device associated with the first application instance 125, and may initiate the second SFU 131 and the second application instance 135. In this way the migration of data and services of the failed application can be seamlessly implemented. A specific failover process will be described in detail later.

It should be appreciated that only some example mechanism and processes of the failover are described above, and are not intended to limit the scope of the present disclosure in any manner. Other detection manners and migration manners for the failed application are also feasible. For example, the second cluster management unit 128 at the second node 120 may directly interact with the first application instance 125 to monitor the fault situation of the first application instance 125. After detecting that the first application instance 125 is failed, the second node 120 may directly interact with the third node 130 without via the first node 110, to migrate associated the data and services to the third node 130.

In some embodiments, the cluster management units 118, 128 and 138 may define, for an upper-layer application, a set of Application Programming Interface (API) irrelevant to the types of nodes, so that the application and the associated SFU may be executed on any type of bottom-layer physical or virtual device without being amended. As described above, through the SFU module, the cluster management units may monitor the availability and serviceability of the corresponding SFUs. Below are example definitions of data structure and APIs for managing SFU:

```
/* PHACS_service_failover_unit_t defines the SFU information */
typedef struct {
    uint64_t sfu_id;      /* SFU ID */
    uint64_t container_id;  /* ID of the Linux Container */
        char application_name[256]; /* Name of application running in
        this SFU */
        char root_folder[256]; /* the root location of this Linux
        Container (SFU) */
        char floating_ip[64]; /* VM primary/external IP */
    char management_ip[64]; /* VM management IP */
        char storage_id[64];  /* ID of storage used by the application */
        char state[16]; /* container current state */
} PHACS_ service_failover_unit_t;
/* Create a new SFU */
uint32_t PHACS_sfu_create(const char* application_name, const char*
root_folder, PHACS_service_failover_unit_t* sfu);
/* Start a SFU container */
uint32_t PHACS_sfu_start(const PHACS_service_failover_unit_t*
sfu);
/* Cease a SFU container */
uint32_t PHACS_sfu_stop(const PHACS_service_failover_unit_t*
sfu);
/* Monitor the status of a SFU container */
uint32_t PHACS_sfu_monitor(const PHACS_service_failover_unit_t*
sfu);
```

In addition, in some embodiments, the cluster management units 118, 128 and 138 may further perform the following management for the corresponding SFU through the corresponding SFU module: managing operations associated with the failover of the SFU, starting or ceasing the SFU, managing IP addresses and storage devices associated with the SFU, and the like. This will be described in detail later.

In addition to the application-level failover, in some embodiments, VM-level failover may be implemented by the cluster management unit. For example, in response to a failure of a certain VM, another VM of the same type may be started in the cluster by the corresponding cluster management unit. This will be described in detail later. Below are example definitions of data structure and APIs used for VM failover:

```
/* Initialize the VM hypervisor configurations and login */
uint32_t PHACS_sddc_init_config(PHACS_sddc_type_t type,
PHACS_sddc_config_t *config);
/* Obtain the current membership list in the cluster */
uint32_t
PHACS_sddc_get_nodes(PHACS_sddc_node_info_t**nodes,
uint32_t *nodes_num);
/* Start a specific VM */
uint32_t PHACS_sddc_start_node(const char* nodename);
/* Cease a specific VM */
uint32_t PHACS_sddc_stop_node(const char* nodename);
/* Reset a specific VM */
uint32_t PHACS_sddc_reset_node(const char* nodename);
/* Failover from a specific VM to target SDDC host */
uint32_t PHACS_sddc_failover_node(const char* nodename, const
char* hostname);
```

Below are example definitions of data structure and APIs for starting a specific VM:

```
class PHACS_sddc_common {
public:
    virtual unsigned int init( ) = 0;
    virtual unsigned int
    get_nodes(std::vector<PHACS_sddc_node_info_t *> &nodes) =
    0;
    virtual unsigned int start_node(std::string nodename) = 0;
    virtual unsigned int stop_node(std::string nodename) = 0;
    virtual unsigned int reset_node(std::string nodename) = 0;
public:
    unsigned int init_sddc(PHACS_sddc_config_t *config);
    static PHACS_sddc_common*
    create_instance(PHACS_sddc_type_t type);
    PHACS_sddc_type_t get_type( ) const { return _type; }
    virtual ~PHACS_sddc_common( );
protected:
    PHACS_sddc_common(PHACS_sddc_type_t type);
protected:
    PHACS_sddc_type_t _type;
    PHACS_sddc_config_t _config;
};
```

In some embodiments, the cluster management units 118, 128 and 138 may further comprise cluster management it enabling dynamic creation and deletion of the cluster and dynamic addition and removal anodes in the cluster. For example, a node may create a cluster through a corresponding cluster management unit. A node may also delete an-created cluster through the cluster management unit. Deleting the cluster may be an ability of a master node of the cluster. In addition, after the cluster is created, the nodes in the cluster may, through the corresponding cluster management unit, add new nodes into the cluster or remove a certain existing node from the cluster.

Below are example definitions of data structure and APIs associated with addition of a VM:

```
/* PHACS_sddc_node_info_t defines the VM information */
typedef struct {
    char nodename[256]; /* VM Name */
    char hostname[256]; /* VM Hypervisor host name */
    char primary_ip[64]; /* VM primary/external IP */
    char interconnect_ip[64]; /* VM interconnect IP */
    char state[16]; /* VM current state */
} PHACS_sddc_node_info_t;
/* PHACS_sddc_type_t defines the supported types of virtual
platforms */
enum PHACS_sddc_type_t {
    PHACS_SDDC_TYPE_UNKNOWN = 0,
    PHACS_SDDC_TYPE_VSPHERE = 1, /* VMware vSphere */
    PHACS_SDDC_TYPE_HYPERV = 2, /* Microsoft Hyper-V */
    PHACS_SDDC_TYPE_KVM = 3, /* KVM */
};
typedef enum PHACS_sddc_type_t PHACS_sddc_type_t;
/* PHACS_sddc_config_t defines the necessary configurations and
login information to interact with VM
hypervisor via hypervisor APIs */
typedef struct {
    char sddc_host[256]; /* vSphere/HyperV/KVM host name/IP */
    char cluster_name[256]; /* Cluster Name */
    char username[256]; /* VM Hypervisor Login Username */
    char password[256]; /* VM Hypervisor Login Password */
} PHACS_sddc_config_t;
```

In addition, in some embodiments, there are further features and functions, including such as a heartbeat mechanism and a messaging domain mechanism, for managing the cluster 100 in the cluster management units 118, 128 and 138. For example, with the heartbeat mechanism, the nodes can acquire membership situations in the cluster, for example, membership list and master and slave nodes and the like, and can also acquire states of other nodes in the cluster. A specific algorithm of the heartbeat mechanism is already known in the art and will not be detailed here.

As another example, the messaging domain mechanism in the cluster may be implemented through the cluster management units 118, 128 and 138. The messaging domain refers to a process communication group, including multiple processes running on multiple nodes. According to an embodiment of the present disclosure, each messaging domain has a unique identification to distinguish from others so that messages targeted to one messaging domain won't be delivered to other messaging domains.

In an embodiment, a messaging domain is specially designed for different application instances of same application running on different nodes in the cluster. Cluster messages exchanged in the messaging domain between these application instances may be globally ordered to implement coordination and decision for the application within range of the cluster. An algorithm for implementing globally ordering for messages is already known in the art and will not be detailed here.

It is feasible to implement, in any proper manner, the same application's dedicated use of a certain messaging domain. For example, an application may invoke a cluster messaging API to join the messaging domain by providing a specific identification of a certain messaging domain, and then the application may register a callback function to be invoked when a message incomes. When there is a message to be sent, the application can call another cluster messaging API to broadcast the message. The message may be delivered to all processes which have joined to the same messaging domain at all nodes in the cluster, via a rapid InterProcess Communication (IPC) channel between the application and the cluster management units, and the cluster interconnect network between the cluster management units. Below are example definitions of data structure and APIs for the application's dedicated use of the messaging domain:

```
/*register a cluster message callback function */
uint32_t cluster_register_message_callback(cluster_lib_handle_t
handle, const char* application_name,
void (*cluster_msg_call_back)(cluster_message_t* msg));
/* broadcast the message to the cluster */
uint32_t cluster_broadcast_message(cluster_lib_handle_t handle,
cluster_message_t *msg);
```

The cluster management units 118, 128 and 138 may be implemented by hardware, software or a combination thereof. For example, the cluster management units 118, 128 and 138 may be implemented as a computer program running on an operating system (OS) of a physical PBBA host machine or running on an OS of the SDDC virtual machine. Alternatively, the cluster management units 118, 128 and 138 may be implemented by a logic circuit. Implementation based on the combination of the computer program and logic circuit is also feasible.

According to an embodiment of the present disclosure, as described above, after the application at the second node 120 is determined as failed, the data and services associated with the application may be migrated from the second node 120 to the third node 130. Example implementation of the migration process of the failed application will be described in detail in conjunction with FIG. 2.

Figure 2:
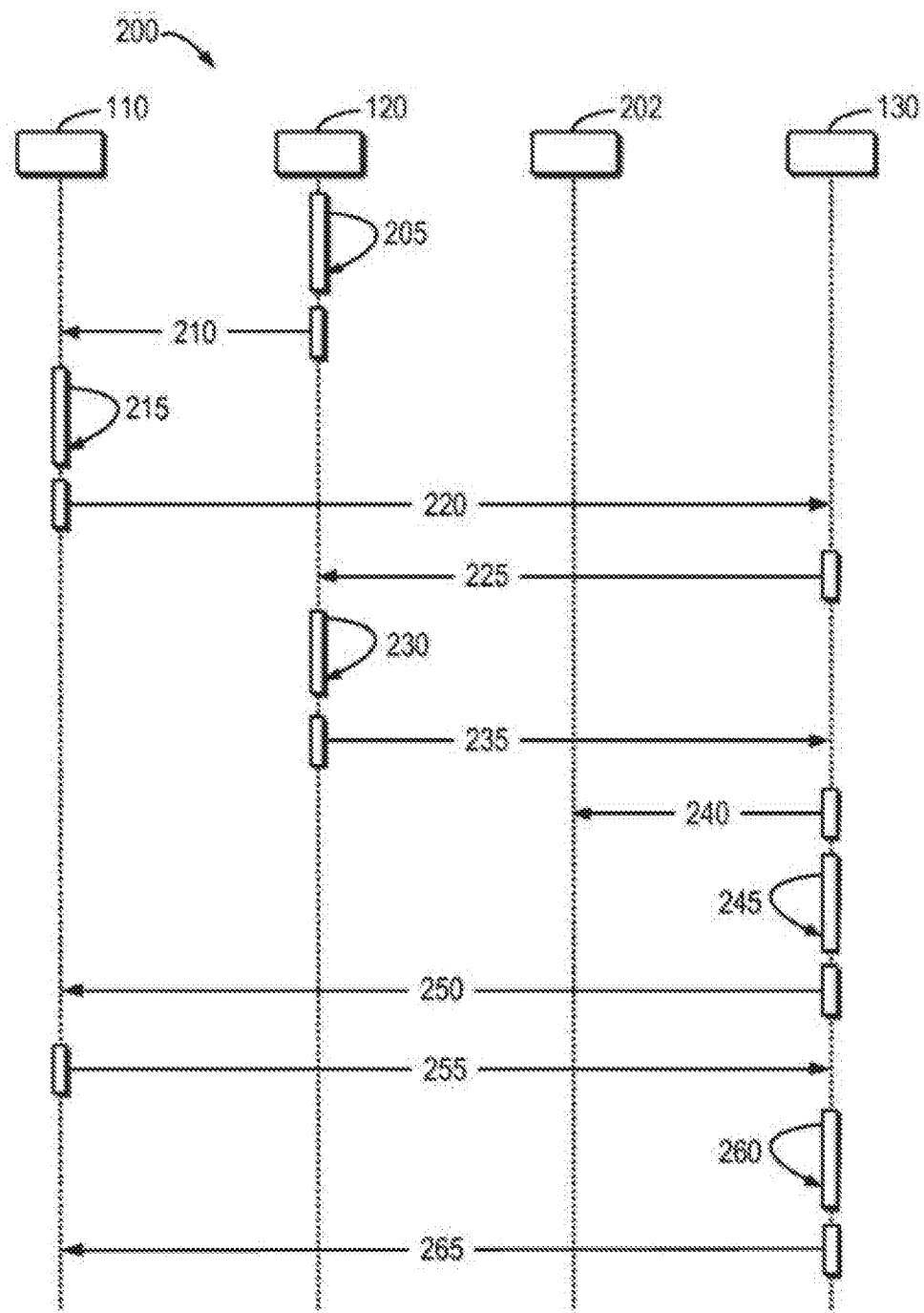
FIG. 2 illustrates communication and processing processes between devices in a cluster.

Reference is made to the schematic diagram shown in FIG. 2 to describe ideas and principles of the embodiment of the present disclosure. FIG. 2 illustrates communication and processing processes 200 between devices in the cluster 100. For easy depiction, illustration will be presented below in conjunction with FIG. 1. It is appreciated that many actions/steps in the process 200 are not requisite, and they may be omitted in other embodiments. This will be described in detail below in this regard.

As shown in the figure, according to the embodiment of the present disclosure, the second node 120 determines (205) whether the local application is failed. As described above, the second node 120 may implement determination of the fault in, any proper manner. As an example, when the first application instance 125 at the second node 120 is failed, as described above, the fault may be determined by monitoring the first application instance 125 via the first SFU proxy 123 packaged in the first SFU 121 at the second node 120. For example, the first application instance 125 and first SFU proxy 123 are both running, and they communicate with each other. If the first SFU proxy 123 receives wrong information from the first application instance 125, or fails to receive the information from the first application instance 125 within a predetermined time period, the first SFU proxy 123 may determine that there is something wrong with the communication. In this case, the first SFU proxy 123 may determine that the first application instance 125 is failed.

After determining (205) that the local application is failed, optionally, the second node 120 sends (210) a failover request for migrating the failed application to the first node 110 serving as the master node of the cluster 100. For ease of depiction, the first node is hereinafter referred to as "master node". As described above, the message interaction between the second node 120 and the master node 110 may be implemented by for example the second cluster management unit 128 in the second node 120 and the first cluster management unit 118 in the master node 110.

After receiving the request, the master node 110 may correspondingly determine that the application at the second node 120 is failed. Then, optionally, the master node 110 determines (215) whether the third node 130 may be used as a destination node for the migration. The master node 110 may take any proper factor into account when determining the destination node. In an embodiment, the master node 110 may select the destination node based on load situations of nodes in the cluster 100. For example, a node with load lower than a predetermined threshold may be selected as the destination node for migration. In another embodiment, the master node 110 may select the destination node according to a predefined backup rule. For example, the master node 110 may select a preset backup node in the cluster 100 as the destination node for migration. When a plurality of backup nodes exist, the master node 110 may select the destination node according to any proper rule. For example, the master node 110 may select a node with a smaller load as the destination node.

After determining (215) the third node 130 as the destination node, optionally, the master node 110 sends, to the third node 130, a message indicating the third node 130 is to serve as the destination node of migration. Message transmission from the master node 110 to the third node 130 may also be implemented by the first cluster management unit 118 in the master node 110 and the third cluster management unit 138 in the third node 130 as described above.

In an embodiment, as shown in FIG. 1, the second node 120 and third node 130 are respectively equipped with the first SFU 121 and second SFU 131 for packaging different instances 125 and 135 of the application. In this case, the message sent (220) from the master node 110 to the third node 130 may comprise an identification of the first SFU 121 so that the third node 130 subsequently initiates the corresponding second SFU 131 according to the identification, thereby implementing the migration of the application. In addition to the identification of the SFU, in some embodiments, the master node 110 may further send, to the third node 130, at least one of: an identification of the second node 120, an identification of the application, and an identification of the storage device (e.g., storage device 202) associated with the application. By using these information, the third node 130 may subsequently communicate with the second node 120 more efficiently, and perform the migration of the application, and the like. Embodiments in this aspect will be further described later.

In response to receiving a migration instruction from the master node 110, the third node 130 may determine that data and services associated with the application at the second node 120 are to be migrated to itself in some embodiments, the determination for example may be implemented by the third node 130 based on the identification of the second node and the application identification received from the master node 110 as described above. Then, optionally, the third node 130 sends (225), to the second node 120, a message indicating an initiation of a failover process.

In response to the message received from the third node 130, the second node 120 initiates migration of data and services associated with the faulty application to the third node 130. As shown in the figure, optionally, the second node 130 first performs migration-related processing locally (230). In an embodiment, the processing may comprise ceasing the first SFU 123 by the second cluster management unit 128 at the second node 120. As described above, management on the first SFU 121 by the second cluster management unit 128 may be implemented through interactions between the first SFU module 129 in the second cluster management unit 128 and the first SFU proxy 123 in the first SFU 121.

After receiving the cease instruction from the second cluster management unit 128, the first SFU 123 may cease the first application instance 125 packaged therein in some embodiments. In addition, the first SFU 123 may further detach the associated storage device (e.g., storage device 202). Through the detachment operation, the correspondence relationship of the first SFU 123 with the storage device is removed so that the storage device is no longer used by the first application instance 125 in the first SFU 123. As described above, the storage device may be located at the second node 120 or in the external cluster storage pool, depending on specific implementation. In this example, as shown in the figure, an associated external storage device 202 is already allocated for the application. Correspondingly, the second node 120 is detached from the external storage device 202.

As described above, the storage device 202 may store information related to data and services associated with the application. For example, the service-related, information comprises a process, a library, configuration information and the like associated with the application. In an embodiment, the second node 120 may regularly store, in the storage device 202, service-related information such as a process, a library and configuration information associated with the first application instance 125. Alternatively or additionally, these information may be sent on demand. The second node 120 may further backup, in the storage device 202, the data associated with the first application instance 125. As such, the third node 130 serving as the migration destination may obtain related information from the storage device 202 in failover, which will be described in detail later.

After completing local processing related to the migration, optionally, the second node 120 sends (235), to the third node 130, a message indicating the completion of local processing. In response to the message, as an example, the third node 130 obtains (240), from the storage device 202, data associated with the application and service-related information such as a process, a library and configuration information and the like. The obtaining may be implemented, for example, by the third node 130 using the identification of the storage device received from the master node as described above. It should be appreciated that obtaining information related to services associated with the application from the external storage device 202 is only exemplary but not limited. Alternatively, the third node 130 may further directly obtain related data and information from the second node 120, for example, through the local third cluster management unit 138 and the second cluster management unit 128 at the second node 120 thereby directly obtaining related data and information at the second node 120.

After obtaining information related to data and services associated with the application, the third node 130 optionally performs (245) local processing associated with the migration. For example, the third node 130 may use the SFU identification and application identification received from the master node 110 as described above to initiate the second SFU 131, and attach the second SFU 131 to the storage device 202. Then, the third node 130 may use the obtained information related to data and services to initiate the second application instance 135, thereby implementing seamless migration of data and services of the application. Optionally; the third node 130, upon completing migration-related processing, sends (250) the master node 110 a message indicating completion of the failover.

In conjunction with FIG. 2, the communication and processing process of devices in the cluster 100 is described above when the application at the second node 120 is failed under the scenario that the first node 110 serves as the master node of the cluster 100 and the second nod 120 serves as the slave node of the cluster 100. In some embodiments, the second node 120 might be the master node of the cluster 100, whereas the first node 110 is the slave node of the cluster 100. For example, the second node 120 may broadcast in the cluster 100 an election request to select itself as the master node of the cluster 100 in response to at least one of the events: failing to receive information of the current master node 110 of the cluster 100 within a predetermined time period, and receiving from the current master node 110 a message indicating re-election of a master node.

In an embodiment, while the second node 120 sends the election request, the second node 120 further receives from other nodes (e, g., the third node 130) in the cluster 100 election requests to select other nodes as the master node. In this case, the second node 120 may, based on any proper rule, determine whether to select itself or select other nodes as the master node. For example, the second node 120 may determine the selection based on at least one of the following comparisons: comparison between time of the second node 120 sending the election request and time of other nodes sending election requests, comparison between starting time of the second node 120 and starting time of other nodes, and comparison between a network address (e.g., Internet Protocol address, namely, IP address) of the second node 120 and network addresses of other nodes.

Hereunder, consider an example in which all the three factors are taken into account to complete re-election of the master node. In this example, first consider the time of sending the election request. If an election result cannot be determined, consider the starting time of multiple nodes sending election requests. If the election result still cannot be determined, the network address of the node will be taken into consideration.

When the time of the second node 120 sending the election request is earlier than the time of other nodes sending election requests by a first predetermined time interval, the second node 120 determines to select itself as the master node, and then correspondingly increments the associated count of elections. The time for sending the election request may be absolute time or relative time. For example, when local time of the second node 120 and other nodes are asynchronous, it is feasible to compare time of sending the election request based on time difference between the absolute time of the node sending the election request and the local time of the node.

If the time of the second node 120 sending the election request is later than the time of other nodes sending election requests by a second predetermined time interval, the second node 120 determines to select other nodes as the master node, and then sends, to other nodes, an approval response to the election request. If the time difference between the two sending time is smaller than a third predetermined time interval, the second node 120 may further determine which node is selected as the master node based on the comparison between its own starting time and starting time of other nodes.

For example, if the starting time of the second node 120 is earlier than the starting time of other nodes by a fourth predetermined time interval, the second node 120 may determines to select itself as the master node and increments the associated count of elections. If the starting time of the second node 120 is later than the starting time of other nodes by a fifth predetermined time interval, the second node 120 determines to select other nodes as the master node and send an approval response to other nodes. If time difference between the two starting time is smaller than a sixth predetermined time interval, the second node 120 may further select the master node based on the network addresses of the two nodes. For example, it is feasible to select a node with a smaller or larger network address as the master node according to a predetermined rule.

It should be appreciated that the first to sixth predetermined time intervals for selecting the master node may be flexibly set as needed. It should be appreciated that the order of comparisons performed for selecting the master node is only exemplary but not restrictive. The scope of the present disclosure is not limited in this regard. In some embodiments, it is feasible to first compare starting time of nodes before comparing the time of selecting election requests. It is also feasible to first compare the site of the network addresses before comparing the time of sending election requests.

In the case of failing to receive election requests from other nodes, in an embodiment, the second node 120 increments the count of elections associated with itself in response to sending the election request itself. In response to receiving an approval response to the election request from other nodes, the second node 120 also increments the count of elections.

In an embodiment, if the count of elections exceeds a threshold count, the second node 120 determines that the second node 120 itself is selected as the master node of the cluster 100, and then the second node 120 broadcasts in the cluster 100 a message indicating that the second node 120 itself has already been selected as the master node. Other nodes, in response to receiving the message, may determine that the second node 120 has already become a new master node of the cluster 100.

Under the scenario that the second node 120 serves as the master node of the cluster 100, if the second node 120 determines that the local application is failed, the second node 120 broadcasts in the cluster 100 a message to re-select a new master node, thereby initiating a new round of election for the master node. A specific process is similar to the aforesaid election process and will not be detailed herein. In response to receiving a message indicating that other nodes (e.g., first node 110) in the cluster 100 have already been selected as a new master node, the second node 120 sends the new master node a failover request for application migration to initiate an application level failover process. The specific process is similar to the process described under the scenario that the first node 110 serves as the master node and will not be detailed here.

It is appreciated that what are described above are only example processes of node election and not intended to limit the scope of the present disclosure. In other embodiments, any other proper factors may be used to determine a new master node. For example, factors such as computing capacity and storage capacity of the nodes, network conditions, and the like, may be taken into consideration.

According to an embodiment of the present disclosure, the nodes in the cluster may be switched between several states during the election of the master node. For example, the node may enter CLUSTER-PENDING state after having received the message received from the current master node and indicating to re-select a new master node as described above. The node may further enter the CLUSTER-PENDING state in response to occurrence of the following errors. For example, when the node cannot write configuration information from the master node into a permanent database, or when the node fails to receive a response from other nodes within a predetermine time period after initiating the election request, the node may first enter a RECOVERY state, and then be switched to the CLUSTER-PENDING state.

When the node is in the CLUSTER-PENDING state, it may be switched to an ELECTION state in response to sending or receiving the election request. After the node is switched to the ELECTION state, it first enters an ELECTION_START sub-state to perform master node election. After the master node is successfully selected, the node is switched from the ELECTION_START sub-state to an ELECTION_INTEGRATION sub-state. In the ELECTION_ INTEGRATION sub-state, the node interacts with other nodes the cluster state information and the relevant data. Then, the node, according to the election result, is correspondingly switched to a MASTER state or SLAVE state. When an error happens, the node may be switched from the MASTER state or SLAVE state to the RECOVERY state. For example, as described above, when the slave node cannot write the configuration information from the master node into the permanent database, it may enter the RECOVERY state. The node in the RECOVERY state may enter the CLUSTER-PENDING state again.

When the node is in the MASTER state, it may enter the CLUSTER-PENDING state in response to a message coming from the current master node and indicating to re-select a new master node. In addition, when the node is in the MASTER state or SLAVE state, it may enter the ELECTION state again in response to the election request, to perform a new round of master node election.

Examples of relevant APIs are presented below:
1. Obtain current cluster membership
   uint32_t    cluster_get_membership(cluster_lib_handle_t handle, cluster_membership_t *membership);
2. Obtain ID of cluster master node
   uint32_t cluster_get_master(cluster_lib_handle_t handle, uint32_t *master)
3. Obtain ID of current node
   uint32_t cluster_get_nodeid(cluster_lib_handle_t handle, uint32_t *nodeid);
4. Obtain information of specific duster node
   uint32_t     cluster_get_node_info(cluster_lib_handle_t handle, uint32_t nodeid, cluster_node_info_t *info);
5. Event to notify when proper membership is changed:
   PS_CLUSTER_MEMBERSHIP_CHANGE
6. Event to notify when new master node is elected:
   PS_CLUSTER_MASTER_ELECTED As described above, in addition to application-level failover, VM-level failover may be performed. For example, the master node 110 may, in response to determining that a certain VM in the cluster 100 is failed, select a VM of the same type in the cluster 100 as a failover node of the faulty VM. As shown in FIG. 2, in this example, the third node 130 is selected by the master node 110 as a failover node. The master node 110 sends (255), to the third node 130, a message indicating that the third node 130 is to serve as the failover node. After receiving the message, the third node 130 performs VM failover processing (260).

In an embodiment, the message sent (255) by the master node 110 to the third node 130 may indicate whether the third node 130 will serve as an active failover node or a backup failover node. When the message indicates that the third node 130 is to serves as the active failover node, the third node 130 may start the SFU associated with the application at the failed VM. In addition to the SFU, the third node 130 may further start an associated application instance, and attach an associated storage device, and the like. The above operations of the third node 130 are similar to operations described above with respect to the application-level failover and will not be detailed here.

In this way, when the VM is failed, it is feasible to, upon implementing the VM-level failover, implement migration of data and services of associated application, thereby substantially reducing the duration of interruption of services. If the message indicates that the third node 130 is to serve as the backup node, the third node 130 will perform conventional operations, without executing operations related to the application-level failover. Optionally, after completing the related processing, the third node 130 sends (265), to the master node 110, a message indicating completion of the failover.

Figure 3:
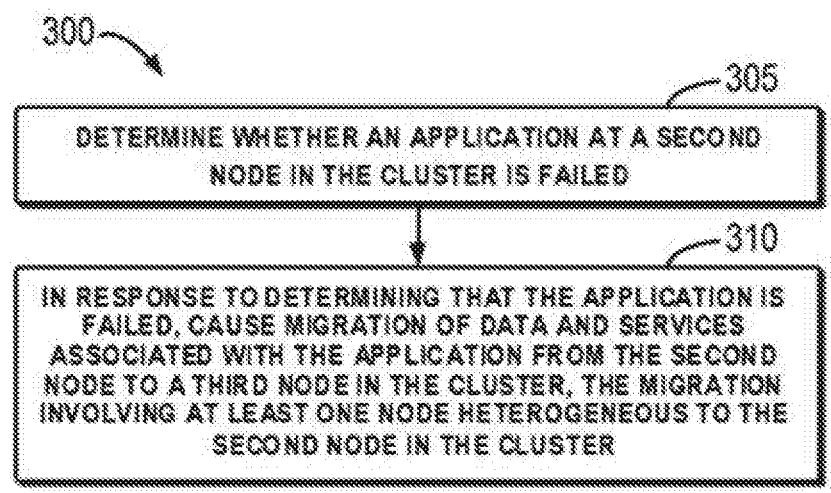
FIG. 3 illustrates a flow chart of an example method implemented at a node in a cluster comprising heterogeneous nodes according to some embodiments of the present disclosure.

FIG. 3 illustrates a flow chart of an example method 300 implemented at a node in a cluster comprising heterogeneous nodes according to some embodiments of the present disclosure. It may be appreciated that the method 300 may be implemented for example at the first node 110 or second node 120 in the cluster 100 shown in FIG. 1 and FIG. 2. For purpose of easy depiction, illustration will be presented in conjunction with FIG. 1 and FIG. 2.

As shown in the figures, at step 305, the first node 110 or second node 120 determines whether the application at the second node 120 is failed. At step 310, in response to determining that the application is failed, the first node 110 or second node 120 causes migration of application-associated data and service from the second node 120 to the third node 130 in the cluster 100, and the migration involving at least one node in the cluster 100 heterogeneous to the second node 120.

In an embodiment, causing the migration may comprise: causing at least one of a process, a library and configuration information associated with the application to migrate from the second node 120 to the third node 130.

In an embodiment, at the second node 120, causing the migration may comprise: in response to determining that the application is failed, sending a failover request for migration to the first node 110 serving as the master node of the cluster 100, at least one of the first node 110 and third node 130 being heterogeneous to the first node 11 and initiating the migration in response to receiving from the third node 130 a message indicating an initiation of a failover process.

In an embodiment, initiating the migration at the second node 120 may comprise: ceasing a service failover unit associated with the application, the service failover unit being a container packaged with an instance of the application and at least one of: a process, a library and configuration information associated with the application. In an embodiment, initiating the migration at the second node 120 may further comprise: detaching the storage device associated with the application.

In an embodiment, at the second node 120, it is further feasible to store, in the storage device, at least one of: a process, a library and configuration information associated with the application in the service failover unit.

In an embodiment, the second node 110 may be the current master node of the cluster 100. In this example, at the second node 110, causing the migration may comprise: in response to determining that the application is failed, broadcasting in the cluster 100 a message for re-selecting a new master node of the cluster 100; in response to receiving a message indicating that the fourth node (not shown) in the cluster 100 has already been selected as the new master node, sending, to the fourth node, a failover request for migration, at least one of the third node 130 and fourth node being heterogeneous to the first node 110; and initiating the migration in response to receiving from the third node 130 a message indication an initiation of a failover process.

In the case that the method 300 is implemented at the second node 120 serving as a slave node of the cluster 100, in an embodiment, the method 300 may further comprise: broadcasting in the cluster 100 a first election request to select the second node 120 as the master node of the cluster 100, in response to at least one of: failing to receive information of the current master node of the cluster 100 within a predetermined time period, and receiving from the current master node a message indicating re-election of a master node of the cluster 100.

In this case, in an embodiment, the method 300 may further comprise: receiving from a fifth node (not shown) in the cluster 100 a second election request to select the fifth node as the master node; and determining whether to select the second node 120 or the fifth node as the master node based on at least one of the following comparisons: comparison between first time of the second node 120 sending the first election request and second time of the fifth node sending the second election request, comparison between first starting time of the second node 120 and second starting time of the fifth node, and comparison between a first Internet Protocol (IP) address of the second node 120 and a second IP address of the fifth node.

In an embodiment, at the second node 120, the method may further comprise: in response to determining that the second node 120 is selected as the master node, incrementing the count of elections associated with the second node 120; and in response to the count of elections exceeding a threshold count, broadcasting in the cluster 100 a message indicating that the second node 120 has already been selected as the master node.

In the case that the method 300 is implemented at the first node 110 serving as a slave node in the cluster 100, in an embodiment, the determining in step 305 may comprise: determining whether a failover request for migration has already been received from the second node 120, at least one of the first node 110 and the third node 130 being heterogeneous to the second node 120.

In this case, in an embodiment, at the first node 110, causing the migration may comprise: in response to determining that the application at the second node 120 is failed by determining that the failover request is received from the second node 120, determining whether the third node 130 is available to be used as a destination node for the migration; and in response to the third node 130 being available to be used as the destination node, sending, to the third node 130, a message indicating that the third node 130 is to serve as the destination node.

In an embodiment, sending at the first node 110 may comprise: at least sending, to the third node 130, an identification of the service failover unit associated with the application, the service failover unit being a container packaged with an instance of the application and at least one of: a process, a library and configuration information associated with the application. In an embodiment, the sending may further comprise: sending, to the third node 130, at least one of: an identification of the second node 120, an identification of the application, and an identification of the storage device associated with the application.

In an embodiment, at the first node 110, the method 300 may further comprise: in response to determining that a sixth node (not shown) serving as a virtual machine in the cluster 100 is failed, selecting a node (e.g., the third node 130) homogeneous with the sixth node in the cluster 100 as a failover node of the sixth node; and sending, to the selected node, a message indicating whether the node is to serve as an active failover node or a backup failover node.

Figure 4:
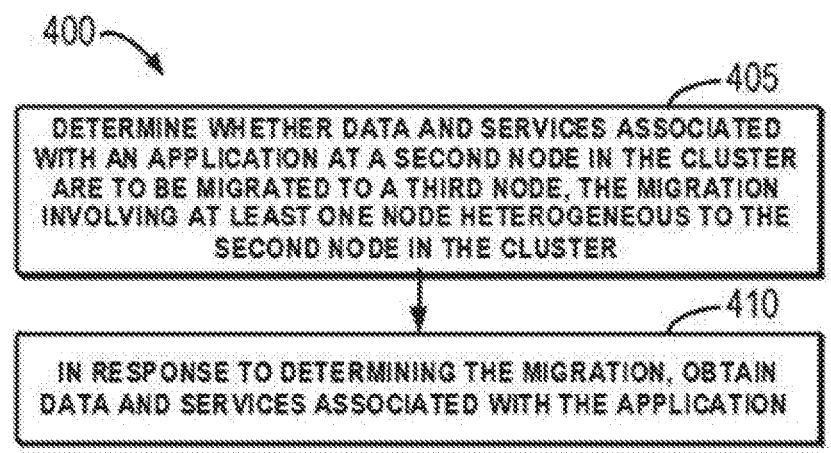
FIG. 4 illustrates a flow chart of an example method implemented at a node in a cluster comprising heterogeneous nodes according to some other embodiments of the present disclosure.

FIG. 4 illustrates a flow chart of an example method 400 implemented at a node in a cluster comprising heterogeneous nodes according to some other embodiments of the present disclosure. It may be understood that the method 400 may be implemented for example at the third node 130 in the cluster 100 shown in FIG. 1 and FIG. 2. For purpose of easy depiction, illustration will be presented in conjunction with FIG. 1 and FIG. 2.

As shown in the figures, at step 405, the third node 130 determines whether data and services associated with the application at the second node 120 in the cluster 100 are to be migrated to the third node 130, and the migration involves at least one node heterogeneous to the second node 120 in the cluster 100. At step 410, the third node 130, in response to determining the migration, obtains the data and services associated with the application.

In an embodiment, the method 400 may further comprise: in response to determining the migration, the third node 130 sending, to the second node 120, a message indicating an initiation of a failover process.

In an embodiment, the obtaining in the step 410 may comprise: obtaining from the storage device at least one of a process, a library and configuration information associated with the application.

In an embodiment, the method 400 may further comprise: using at least one of the obtained process, library and configuration information associated with the application to start the service failover unit associated with the application, the service failover unit being a container packaged with an instance of the application and at least one of: a process, a library and configuration information associated with the application.

In an embodiment, the determination in step 405 may comprise: determining whether a message indicating that the third node 130 is to serve as the destination node for migration has been received from the master node (e.g., the first node 110) of the cluster 100, at least one of the master node and the third node 130 being heterogeneous to the second node 120.

In an embodiment, the third node 130 may be a virtual machine. In this example, the method 400 may further comprise: receiving from the master node (e.g., the first node 110) a message indicating that the third node 130 is to serve as an active failover unit of a seventh node (not shown) homogeneous with the third node 130 in the cluster 100; and at least starting the service failover unit associated with the application at the seventh node, the service failover unit being a container packaged with an instance of the application and at least one of the following: a process, a library and configuration information associated with the application at the seventh node. In an embodiment, the starting may further comprise: attaching a storage device associated with the application at the seventh node.

In an embodiment, the third node 130 may be a master node of the cluster 100. In this example, the determining in step 405 may comprise: determining whether a failover request for migration has been received from the second node 120, the third node 130 being heterogeneous to the second node 120.

It should be appreciated that operations performed by the first node 110, second node 120 and third node 130 and relevant features described above in conjunction with FIGS. 1 and 2 also apply to the methods 300 and 400, and have the same effects. Specific details will not be described in detail any more.

Figure 5:
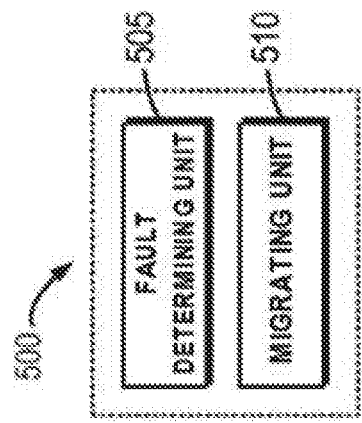
FIG. 5 illustrates a block diagram of an apparatus according to some embodiments of the present disclosure.

FIG. 5 illustrates a block diagram of an apparatus 500 in a cluster comprising heterogeneous nodes according to some embodiments of the present disclosure. In some embodiments, the apparatus 500 may be implemented at the first node 110 or second node 120 in the cluster 100 shown in FIG. 1 and FIG. 2.

As shown in the figure, the apparatus 500 comprises: a fault determining unit 505 configured to determines whether the application at the second node 120 is failed; and a migration unit 510 configured to, in response to determining that the application is failed, cause migration of data and services associated with the application from the second node 120 to the third node 130 in the cluster 100, the migration involving at least one node heterogeneous to the second node 120 in the cluster 100.

In an embodiment, the migration unit 510 may be further configured to: cause at least one of a process, a library and configuration information associated with the application to be migrated from the second node 120 to the third node 130.

In the case that the apparatus 500 is implemented at the second node 120, in an embodiment, the migration unit 510 may comprise: a request unit configured to, in response to determining that the application is failed, send a failover request for migration to the first node 110 serving as the master node of the cluster 100, at least one of the first node 110 and third node 130 being heterogeneous to the first node 110; and a migration initiating unit configured to initiate the migration in response to receiving from the third node 130 a message indicating, an initiation of a failover process.

In an embodiment, the migration initiating unit may comprise: an SFU ceasing unit configured to cease a service failover unit associated with the application, the service failover unit being a container packaged with an instance of the application and at least one of the following: a process, a library and configuration information associated with the application. In an embodiment, the migration initiating unit may further comprise: a detaching unit configured to detach the storage device associated with the application.

In the case that the apparatus 500 is implemented at the second node 120, in an embodiment, the apparatus 500 may further comprise a storage control unit configured to store, in the storage device, at least one of: a process, a library and configuration information associated with the application in the service failover unit.

In an embodiment, the second node 110 may be the current master node of the cluster 100. In the case that the apparatus 500 is implemented at the second node 120, the migration unit 510 may comprise: a re-selection requesting unit configured to, in response to determining that the application is failed, broadcast in the cluster 100 a message for re-selecting a new master node of the cluster 100; a requesting unit configured to, in response to receiving a message indicating that the fourth node (not shown) in the cluster 100 has already been selected as the new master node, send, to the fourth node, a failover request for migration, at least one of the third node 130 and fourth node being heterogeneous to the first node 110; and a migration initiating unit configured to initiate the migration in response to receiving from the third node 130 a message indicating an initiation of a failover process.

In the case that the apparatus 500 is implemented at the second node 120 as the slave node, in an embodiment, the apparatus 500 may further comprise: an election requesting unit configured to broadcast in the cluster 100 a first election request to select the second node 120 as the master node of the cluster 100 in response to at least one of: failing to receive information of the current master node of the cluster 100 within a predetermined time period, and receiving from the current master node a message indicating re-election of a master node of the cluster 100.

In this case, in an embodiment, the apparatus 500 may further comprise: a request receiving unit configured to receive from a fifth node (not shown) in the cluster 100 a second election request to select the fifth node as the master node; and an electing unit configured to, determine whether to select the second node 120 or the fifth node as the master node based on at least one of the following comparisons: comparison between first time of the second node 120 sending the first election request and second time of the fifth node sending the second election request, comparison between first starting time of the second node 120 and second starting time of the fifth node, and comparison between a first Internet Protocol (IP) address of the second node 120 and a second IP address of the fifth node.

In an embodiment, the apparatus 500 implemented at the second node 120 may further comprise: a counting unit configured to, in response to determining that the second node 120 is selected as the master node, increment the count of elections associated with the second node 120; and a result sending unit configured to, in response to the count of elections exceeding a threshold count, broadcast in the cluster 100 a message indicating that the second node 120 has already been selected as the master node.

In the case that the apparatus 500 is implemented at the first node 110, in an embodiment, the fault determining unit 505 may be configured to: determine whether a failover request for migration has already been received from the second node 120, at least one of the first node 110 and the third node 130 being heterogeneous to the second node 120.

In this case, in an embodiment, the migration unit 510 may comprise: a destination determining unit configured to, in response to determining that the application at the second node 120 is failed by determining that the failover request is received from the second node 120, determine whether the third node 130 is able be used as a destination node for the migration; and a destination indicating unit configured to, in response to the third node 130 being available to be used as the destination node, send, to the third node 130, a message indicating that the third node 130 is to serve as the destination node.

In an embodiment, the destination indicating unit may be further configured at least to send, to the third node 130, an identification of the service failover unit associated with the application, the service failover unit being a container packaged with an instance of the application and at least one of: a process, a library and configuration information associated with the application. In an embodiment, the destination indicating unit may be further configured to send the third node 130 at least one of: an identification of the second node 120, au identification of the application, and an identification of the storage device associated with the application.

In an embodiment, the apparatus 500 implemented at the first node 110 may further comprise: a node selecting unit configured to, in response to determining that a sixth node (not shown) serving as a virtual machine in the cluster 100 is failed, select a node (e.g., the third node 130) homogeneous with the sixth node in the cluster 100 as a failover node of the sixth node; and a node indicating unit configured to send, to the selected node, a message indicating whether the node is to serve as an active failover node or a backup failover node.

Figure 6:
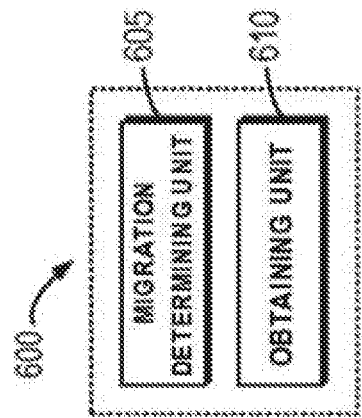
FIG. 6 illustrates a block diagram of an apparatus according to some other embodiments of the present disclosure.

FIG. 6 illustrates, a block diagram of an apparatus 600 in a cluster comprising heterogeneous nodes according to some other embodiments of the present disclosure. In some embodiments, the apparatus 600 may be implemented at the third node 130 in the cluster 100 shown in FIG. 1 and FIG. 2.

As shown in FIG. 6, the apparatus 600 comprises: a migration determining unit 605 configured to determine whether data and services associated with the application at the second node 120 in the cluster 100 are to be migrated to the third node 130, and the migration involving at least one node heterogeneous to the second, node 120 in the cluster 100; and an obtaining unit 610 configured to, in response to determining the migration, obtain the data and services associated with the application.

In an embodiment, the apparatus 600 may further comprise: a failover indicating unit configured to, in response to determining the migration, send, to the second node 120, a message indicating an initiation of a failover process.

In an embodiment, the obtaining unit 610 may further be configured to obtain from the storage device at least one of a process, a library and configuration information associated with the application.

In an embodiment, the apparatus 600 may further comprise: an SFU starting unit configured to use at least one of the obtained process, library and configuration information associated with the application to start the service failover unit associated with the application, the service failover unit being a container packaged with an instance of the application and at least one of the following: a process, a library and configuration information associated with the application.

In an embodiment, the migration determining unit 604 may be further configured to: determine whether a message indicating that the third node 130 is to serve as the destination node for migration has been received from the master node (e.g., the first node 110) of the cluster 100, at least one of the master node and the third node 130 being heterogeneous to the second node 120.

In an embodiment, the apparatus 600 may be a virtual machine. In this example, the apparatus 600 may further comprise: a node indication receiving unit configured to receive from the master node (e.g., the first node 110) a message indicating that the third node 130 is to serve as an active failover unit of a seventh node (not shown) homogeneous with the third node 130 in the cluster 100; and a starting unit configured to at least start the service failover unit associated with the application at the seventh node, the service failover unit being a container packaged with an instance of the application and at least one of: a process, a library and configuration information associated with the application at the seventh node. In an embodiment, the starting unit may be further configured to attach a storage device associated with the application at the seventh node.

In an embodiment, the third node 130 where the apparatus 600 is implemented may be a master node of the cluster 100. In this example, the migration determining unit 605 may be further configured to determine whether a failover request for migration has been received from the second node 120, the third node 130 being heterogeneous to the second node 120.

It should be appreciated that each unit in apparatus 500 and apparatus 600 corresponds to each step in the process 200 described with reference to FIG. 1 and FIG. 2 and in the method 300 and method 400 described with reference to FIGS. 3 and 4. Hence, operations and features described above with reference to FIGS. 1-4 also apply to the apparatus 500 and 600 and units included therein, and have the same effects. Specific details will not be described in detail any more.

In addition, units included in the apparatus 500 and 600 may be implemented in various manners, including software, hardware, firmware and any combination thereof. In an embodiment, one or more units may be implemented using software and/or firmware, e.g., machine executable instructions stored in a storage medium. In addition to the machine-executable instructions or alternatively, all or partial units in the apparatus 500 and 600 may be at least partially implemented by one or more hardware logic components. Exemplarily and unrestrictively, hardware logic components in an exemplary type that may be used comprise a field-programmable gate arrays (FPGA), Application Specific Integrated Circuit (ASIC). Application Specific Standard Parts (ASSP), System on Chip (SOC), Complex Programmable Logic Device (CPLD) and the like.

Figure 7:
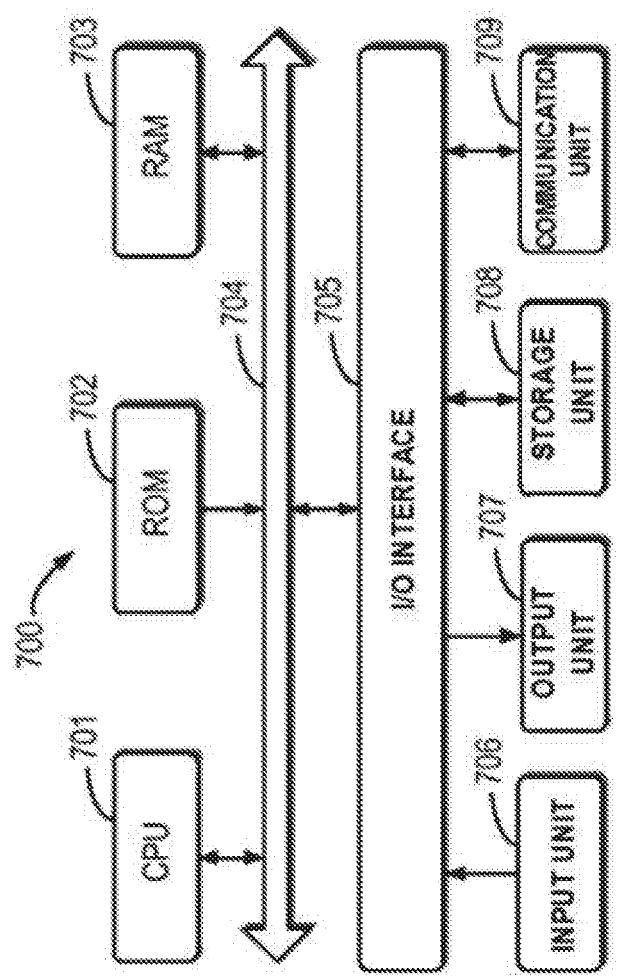
FIG. 7 illustrates a block diagram of an electronic device that can be used for implementing embodiments of the present disclosure.

FIG. 7 illustrates a block diagram of a node 700 in a cluster comprising heterogeneous nodes that can be used for implementing embodiments of the present disclosure. As shown in FIG. 7, the node 700 includes a controller also referred to as a central processing unit (CPU) 701, which may perform various suitable actions and processing according to programs stored in a read only memory (ROM) 702 and/or a random access memory (RAM) 703, in the ROM 702 and/or RAM 703, various programs and data required for operations of the node 700 may be stored. The CPU 701, the ROM 702 and the RAM 703 are connected to one another via a bus 704. An input/output (I/O) interface 705 is also connected to the bus 704.

A plurality of components in the node 700 are connected to the I/O interface 707: an input unit 706, such as a keyboard, a mouse, or the like; an output unit 707, such as various types of displays, loudspeakers, and the like; the storage unit 708 such as a magnetic disk, an optical disk, and the like; and a communication unit 709, such as a network card, a modem, a wireless communication transceiver, and the like. The communication unit 709 allows the apparatus 700 to exchange information/data with other devices over a computer network such as Internet and/or various types of telecommunication networks. Especially, in the embodiments of the present disclosure, the communication unit 709 permits communication with other nodes in the cluster.

In some embodiments, the CPU 701 may be configured to perform various procedures and processing, such as the process 200 and method 300 or 400. In some embodiments, the process 200, method 300 or 400 may be implemented, for example, as computer software programs that are tangibly embodied in a machine-readable medium, such as storage unit 708. In some embodiments, a part or all of the computer program may be loaded and/or installed onto the apparatus 700 via the ROM 702 and/or the communication unit 709. When the computer program is uploaded to the RAM 703 and executed by the CPU 701, one or more steps of the above process 200, method 300 or 400 described above may be performed. Alternatively, in other embodiments, the CPU 701 may also be configured in any other proper manners to implement the above process/method.

Particularly, according to the embodiments of the present disclosure, the processes described above with reference to FIGS. 1-4 may be implemented as a computer program product that may be tangibly stored on a non-transient computer readable storage medium and include machine-executable instructions which, when executed, cause a machine to implement various aspects of the present disclosure.

The computer readable storage medium may be a tangible device that may store instructions for use by an instruction execution device. The computer readable storage medium may include, but not limited to, for example, an electronic storage device, a magnetic storage device, an optical storage device, an electromagnetic storage device, a semiconductor storage device, or any suitable combination thereof. Non-exhaustive and more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other electromagnetic waves propagating freely, electromagnetic waves propagating through a waveguide or other transmission media (for example, light pulses through an optical fiber cable), or electrical signals transmitted through a wire.

Computer readable program instructions for carrying out operations of the present disclosure may be assembly instructions, instruction-set-architecture (ISA) instructions, machine instructions, machine dependent instructions, microcode, firmware instructions, state-setting data, or either source codes or object codes written in any combination of one or more programming languages, including an object oriented programming language such as Smalltalk, C++ or the like, and conventional procedural programming languages, such as a "C" programming language or similar programming languages. The computer readable program instructions may be executed entirely on a user's computer, partly on the user's computer, as a stand-alone software package, partly on the user's computer and partly on a remote computer, or entirely on the remote computer or server. In the scenario involving the remote computer, the remote computer may be connected to the user's computer over any type of networks, including a local area network (LAN) or a wide area network (WAN), or connected to an external computer (for example, through the Internet using an Internet Service Provider). In some embodiments, state information of the computer readable program instructions may be utilized to customize electronic circuitry including, for example, programmable logic circuitry, field-programmable gate arrays (FPGA), or programmable logic arrays (PLA), which may execute the computer readable program instructions, in order to implement aspects of the present disclosure.

Aspects of the present disclosure are described herein with, reference to block diagrams and/or flowcharts of devices, methods, and computer program products according to embodiments of the invention. It is to be understood that each block of the block diagrams and/or flowcharts and combinations of the blocks in the flowchart illustrations and/or block diagrams and/or flowcharts may be implemented by computer readable program instructions.

The various embodiments of the present disclosure have been described for purposes of illustration, but the present disclosure is not intended to be limited to these disclosed embodiments. Without departing from essence of the present disclosure, all modifications and variations fall into a protection scope of the present disclosure as defined by the claims.

What is claimed is:

1. A method implemented in a cluster, the cluster comprising a plurality of heterogeneous nodes, the method comprising the steps, performed at a first node of the cluster, of:
   determining whether an application at a second node in the cluster is failed; and
   in response to determining that the application is failed, causing migration of data and services associated with the application from the second node to a third node in the cluster, the migration involving at least one node heterogeneous to the second node in the cluster,
   wherein the first node is a slave node of the cluster, and the first and second nodes are the same node, and the method further comprises:
      broadcasting, in the cluster, a first election request to select the first node as the master node of the cluster in response to at least one of:
         failing to receive information from the current master node of the cluster within a predetermined time period, and
         receiving, from the current master node, a message indicating re-election of a master node of the cluster.

2. The method according to claim 1, wherein causing the migration comprises:
   causing at least one of a process, a library and configuration information associated with the application to be migrated from the second node to the third node.

3. The method according to claim 1, wherein causing the migration includes:
   in response to determining that the application is failed, sending a failover request for the migration to a master node of the cluster, at least one of the master node and the third node being heterogeneous to the first node; and
   initiating the migration in response to receiving from the third node a message indicating an initiation of a failover process.

4. The method according to claim 1, wherein the initiating comprises:
   ceasing a service failover unit associated with the application, the service failover unit being a container packaged with an instance of the application and at least one of a process, a library and configuration information associated with the application.

5. The method according to claim 4, wherein the initiating comprises:
   detaching a storage device associated with the application.

6. The method according to claim 4, further comprising:
   storing, in a storage device, at least one of a process, a library and configuration information associated with the application in the service failover unit.

7. The method according to claim 1, further comprising:
   receiving, from a fifth node in the cluster, a second election request to select the fifth node as the master node; and
   determining whether to select the first node or the fifth node as the master node based on at least one of:
      a comparison between first time at which the first node sends the first election request and second time at which the fifth node sends the second election request,
      a comparison between first starting time of the first node and second starting time of the fifth node, and
      a comparison between a first Internet Protocol (IP) address of the first node and a second IP address of the fifth node.

8. The method according to claim 7, further comprising:
   in response to determining that the first node is selected as the master node, incrementing a count of elections associated with the first node; and
   in response to the count of elections exceeding a threshold count, broadcasting, in the cluster, a message indicating that the first node has already been selected as the master node.

9. The method according to claim 1, further including the steps, performed at the third node, of:
   determining whether the data and services associated with an application at a second node in the cluster are to be migrated to the third node; and
   in response to determining the migration, obtaining the data and services associated with the application.

10. The method according to claim 9, further comprising the step, performed at the third node, of:
    in response to determining the migration, sending, to the second node, a message indicating an initiation of a failover process.

11. The method according to claim 9, wherein the obtaining comprises:
    obtaining, from a storage device, at least one of a process, a library and configuration information associated with the application.

12. The method according to claim 11, further comprising the step, performed at the third node, of:

using at least one of the obtained process, library and configuration information associated with the application to start a second service failover unit associated with the application, the second service failover unit being a container packaged with an instance of the application and the at least one of the a process, a library and configuration information associated with the application.

13. The method according to claim 9, wherein the third node is a slave node of the cluster, and the determining comprises:
    determining whether a message indicating that the third node is to serve as a destination node for the migration has been received from the master node of the cluster, at least one of the master node and the third node being heterogeneous to the second node.

14. A computerized device configured and operative as a first node of a cluster of heterogeneous nodes, comprising:
    a central processing unit;
    memory coupled to the central processing unit; and
    I/O interface circuitry coupled to the memory and central processing unit to connect the computerized device, as the first node, to other nodes of the cluster,
    the memory including computer program instructions executed by the central processing unit to cause the computerized device, as the first node, to:
        determine whether an application at a second node in the cluster is failed; and
        in response to determining that the application is failed, cause migration of data and services associated with the application from the second node to a third node in the cluster, the migration involving at least one node heterogeneous to the second node in the cluster,
    wherein the first node is a slave node of the cluster, and the first and second nodes are the same node, and the method further includes broadcasting, in the cluster, a first election request to select the first node as the master node of the cluster in response to at least one of:
        failing to receive information from the current master node of the cluster within a predetermined time period, and
        receiving, from the current master node, a message indicating re-election of a master node of the cluster.

15. The computerized device according to claim 14, wherein causing the migration comprises:
    causing at least one of a process, a library and configuration information associated with the application to be migrated from the second node to the third node.

16. The computerized device according to claim 14, wherein causing the migration includes:
    in response to determining that the application is failed, sending a failover request for the migration to a master node of the cluster, at least one of the master node and the third node being heterogeneous to the first node; and
    initiating the migration in response to receiving from the third node a message indicating an initiation of a failover process.

17. The computerized device according to claim 14, wherein the initiating comprises:
    ceasing a service failover unit associated with the application, the service failover unit being a container packaged with an instance of the application and at least one of a process, a library and configuration information associated with the application.

18. The computerized device according to claim 17, wherein the initiating comprises:
    detaching a storage device associated with the application.

19. The computerized device according to claim 18, wherein the computer program instructions further cause the computerized device, as the first node, to:
    store, in a storage device, at least one of a process, a library and configuration information associated with the application in the service failover unit.

20. The computerized device according to claim 14, wherein the computer program instructions further cause the computerized device, as the first node, to:
    receive, from a fifth node in the cluster, a second election request to select the fifth node as the master node; and
    determine whether to select the first node or the fifth node as the master node based on at least one of:
        a comparison between first time at which the first node sends the first election request and second time at which the fifth node sends the second election request,
        a comparison between first starting time of the first node and second starting time of the fifth node, and
        a comparison between a first Internet Protocol (IP) address of the first node and a second IP address of the fifth node.

* * * * *